United States Patent Office 3,065,206
Patented Nov. 20, 1962

3,065,206
ANILINE-ALDEHYDE-POLYAMINE POLYMERS AND THEIR USE AS ANTIOXIDANTS IN GASOLINES
Walter M. Chamot, Brookfield, Ill., assignor to Nalco Chemical Company, a corporation of Delaware
No Drawing. Filed Jan. 9, 1958, Ser. No. 707,856
1 Claim. (Cl. 260—72.5)

This invention relates to oil soluble condensation polymers of aniline and substituted anilines, alkylene polyamines and lower aliphatic aldehydes.

Due to the various refining techniques used in the production of liquid petroleum fuels such as gasoline, it is well known such products tend to deteriorate and that this deterioration is prevented by incorporating with such fuels minor amounts of materials known as stabilizers or antioxidants. The catalytic cracking of petroleum hydrocarbons to form gasolines tends to produce products which are unstable and which form sludges or gums. They also tend to discolor the gasolines under conditions of storage and use. It is exteremely beneficial to have chemicals to retard these effects, but these additives must be added in very small amounts so as not to interfere with the performance of gasolines in internal combustion engines.

The present invention has for one of its objects the provision of novel polymeric substances.

Another object is to provide new compounds, which as gasoline antioxidants, give superior results at extremely small dosages. Other objects will appear hereinafter.

The condensation polymers contemplated within the scope of this invention are formed by condensing aniline or a substituted aniline with alkylene polyamines and a lower aliphatic aldehyde at a molar ratio of aniline or substituted aniline to alkylene polyamine in the range of 1:0.5–1, respectively, and a molar amount of the adehyde within the range of 1.5–2.1 times the total mols of the aniline with the further poviso that the total mols of aldehyde do not exceed 1.1 times the total mols of the aniline and the alkylene polyamine. Molar ratios of anilines to aldehydes to polyamines of approximately 1:2:1, respectively, are eminently suitable as stabilizers for gasolines. The products vary from viscous liquids to solid compositions, all of which are oil soluble. The polymers so produced are essentially linear in nature and are essentially free of cross-linking. It has been found that the antioxidant activity of the substantially linear polymers of the instant invention is good with polymers having either low or high degrees of condensation. In general, the polymers contemplated by this invention are estimated to have a molecular weight in the range of about 500–10,000.

The anilines and substituted anilines which may be used to prepare the polymers may be such materials as aniline, alkyl substituted anilines, N-substituted anilines and alkyl substituted N-substituted anilines. Because the polymers are believed to be substantially linear in molecular configuration, it is desirable that the particular aniline employed contain at least two reactive positions, generally the ortho- and para-positions, with which the aldehyde may react. Typical examples of anilines that may be employed in the preparation of the polymers include such chemicals as aniline, N-methyl aniline, N,N-dimethyl aniline, para-octyl aniline, para-octadecyl aniline, para-methyl-N,N-dihexyl aniline, and meta ethyl N,N-dimethyl aniline. Anilines useful in accordance with the present invention include those falling within the following structural formula:

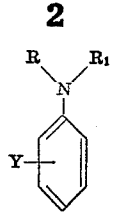

wherein R and $R_1$ are hydrogen or a lower alkyl group of not more than six carbons, and R and $R_1$ may be the same or different; and Y is hydrogen or an aliphatic hydrocarbon radical containing up to 18 carbons.

The alkylene polyamines that may be used include such materials as ethylene diamine, hexamethylene diamine, diethylene triamine, triethylene tetramine, tetraethylene pentamine, trimethylene diamine, propylene diamine, dipropylene triamine, and the like. The amines employed should contain a minimum of at least two amino groups having a reactive hydrogen on the amino nitrogens, i.e., primary of secondary amino groups. In addition to using the alkylene polyamines the substituted alkylene polyamines such as hydroxyethyl ethylene diamine and similar type compounds may be used with equal facility. The preferred alkylene diamines are the polyalkylene polyamines—diethylene triamine giving a polymer which is outstanding as an antioxidant for cracked petroleum fuels.

The aldehydes are preferably lower aliphatic aldehydes having 1–2 carbons (formaldehyde and acetaldehyde). Formaldehyde may be used in its gaseous form or in other forms such as the solid paraformaldehyde or formaldehyde dissolved in water and nonaqueous polar media such as isopropanol.

The polymers are usually prepared by first mixing the aniline and alkylene polyamine and then adding the aldehyde with cooling. An initial reaction occurs on the addition of the aldehyde, and cooling is necessary. The reaction mixture is then heated to at least 80° C. for a period of ½ hour or more at atmospheric pressure or under vacuum. The water of reaction resulting from the condensation is removed in order to obtain a high degree of polymerization. This may be done by including in the reaction mixture a solvent for the water such as isopropanol—the solvent having a boiling point above the reaction temperature. Preferably, however, the water is removed by distillation from the reaction mixture. The reaction may be conducted at elevated temperatures ranging from about 80° C. to as high as 250° C. for periods of time ranging from as little as ½ hour to over 20 hours. As a general rule, the more elevated the temperature the shorter will be the reaction time. Also the higher the temperature and the longer the reaction time, the more viscous the products become.

In order to illustrate the preparation of the several typical polymers the following are given by way of example:

EXAMPLE I

Formaldehyde was dissolved in isopropanol and was added to a mixture of N,N-dimethyl aniline and diethylene triamine with cooling. The molar ratio of the aniline to formaldehyde to the polyamine was 1:2:1, respectively. After the initial heat had dissipated, the reaction mixtures was heated at 85° C. at atmospheric pressure for 14 hours. The resultant product was a viscous, red polymer which was soluble in isopropanol.

EXAMPLE II

The same general procedure and molar ratio of reactants was employed as in Example I, but instead of using diethylene triamine, tetraethylene pentamine was used. The mixture was refluxed at 85–95° C. for 2 hours, and the solvent was removed under vacuum. The resultant product was a light yellow, viscous liquid.

EXAMPLE III

Aniline was mixed with paraformaldehyde and cooled to 15° C. Ethylene diamine was added slowly with cooling. An exothermic reaction resulted which gradually allowed the paraformaldehyde to dissolve into the liquid mixture of the amine and aniline. The mixture, containing the aniline, formaldehyde, and polyamine at mol ratios of 1:2:1, respectively, was gradually heated up to 115° C. for 15 minutes under about 100 mm. vacuum. A sample of this product was withdrawn which was a light yellow, viscous liquid having a viscosity in centipoises of 50–75. The heat was then elevated to 175° C. with the vacuum still applied, a more viscous liquid of about 150–200 centipoise viscosity resulted. Further heating at 210–220° C. under vacuum for 30 minutes resulted in a very viscous red liquid which was nearly a solid.

The products produced in each of the above examples are readily soluble in such solvents as benzene, isopropanol, and methyl alcohol and are soluble in gasoline and similar related liquid hydrocarbons in the concentrations employed in antioxidant or stabilization treatment thereof.

To demonstrate the usefulness of these polymers as antioxidants for cracked petroleum distillates the oxidation stability of a cracked gasoline was determined by the induction period method described in ASTM designation D525–49. Briefly, the aforementioned ASTM induction test involves the initial establishment of a 100 lbs. oxygen atmosphere in a closed bomb over a body of gasoline to be tested. The temperature is maintained at 100° C., and the test is terminated when the pressure drop in the test vessel is more than two lbs. in a 15-minute period. The total time of the test period is observed—the longer the induction period, the better is the stability of the gasoline being tested.

The amounts of both additives tested were 10 parts per million on a weight basis. A commercial antioxidant, 2,6-ditertiarybutyl-4-methylphenol, was used for purposes of comparison.

*Table I*

| Test No. | Treatment | Induction Period, hours |
|---|---|---|
| 1 | Blank | 11½ |
| 2 | 2,6-ditertiarybutyl-4-methylphenol | 14½ |
| 3 | Composition of Example I | 33 |

From the above it becomes obvious that the compositions of the invention are superior to the commercial antioxidant and are effective at extremely low dosages. When treating cracked petroleum distillate fuels good results are obtained when the products are used at a dosage of as little as 0.5 part per million on a weight basis with good results being obtained at 10 to 50 parts per million. In some cases it may be necessary to use up to 500 parts per million, but generally this is an extreme case.

It has been observed that the compositions of this invention also have mental deactivating properties. Metals such as iron and copper act as catalysts in the degradation of gasolines, and minute amounts of the metals accelerate the degradation rate manyfold. The compositions of this invention retard the undesirable catalytic effect of metals—a property usually referred to as metal deactivating.

The invention is hereby claimed as follows:

A substantially linear condensation polymer having a molecular weight in the range of about 500–10,000 formed by the condensation reaction at a temperature in the range of 80–250° C. for ½–20 hours of a mixture of (a) an aniline of the formula

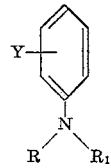

wherein R is selected from the group consisting of hydrogen and lower alkyl of 1–6 carbons, $R_1$ is selected from the group consisting of hydrogen and lower alkyl of 1–6 carbons, and Y is selected from the group consisting of hydrogen and an aliphatic hydrocarbon group with not more than 18 carbons; (b) an aldehyde selected from the group consisting of formaldehyde and acetaldehyde; and (c) an alkylene polyamine selected from the group consisting of polyalkylene polyamines having 3–5 amino groups and alkylene groups selected from the group consisting of ethylene and propylene and lower alkylene diamines at a mol ratio in said mixture of said aniline to said alkylene polyamine in the range of 1:0.5–1, respectively, and a mol ratio of said aldehyde to said aniline of 1.5–2.1:1, the mol ratio of said aldehyde to the total mols of said aniline and said alkylene polyamine not exceeding 1.1:1.

References Cited in the file of this patent
UNITED STATES PATENTS

| | | |
|---|---|---|
| 1,726,713 | North et al. | Sept. 3, 1929 |
| 1,780,334 | Burnett et al. | Nov. 4, 1930 |
| 2,101,215 | Graves | Dec. 7, 1937 |
| 2,251,239 | Krzikalla et al. | Sept. 30, 1941 |
| 2,264,894 | Shoemaker | Dec. 2, 1941 |
| 2,265,051 | Adams | Dec. 2, 1941 |
| 2,317,757 | Graf | Apr. 21, 1943 |
| 2,352,387 | Kopff | June 21, 1944 |
| 2,422,013 | Haury et al. | June 10, 1947 |
| 2,513,996 | Haury | July 4, 1950 |

UNITED STATES PATENT OFFICE
CERTIFICATE OF CORRECTION

Patent No. 3,065,206                      November 20, 1962

Walter M. Chamot

It is hereby certified that error appears in the above numbered patent requiring correction and that the said Letters Patent should read as corrected below.

Column 2, line 20, for "of" read -- or --; column 4, line 7, for "mental" read -- metal --; line 51, for "2,251,239" read -- 2,257,239 --; line 55, for "Kopff ----- June 21, 1944" read -- Hopff ----- June 27, 1944 --.

Signed and sealed this 24th day of September 1963.

(SEAL)
Attest:

ERNEST W. SWIDER
Attesting Officer

DAVID L. LADD
Commissioner of Patents